United States Patent
Nakaishi et al.

(10) Patent No.: US 7,192,652 B2
(45) Date of Patent: Mar. 20, 2007

(54) RUST PREVENTIVE FILM FOR STRETCH PACKAGING

(75) Inventors: Masahiko Nakaishi, Shiga (JP); Yasumitsu Miyata, Yokohama (JP); Kunio Bizen, Fujisawa (JP); Takeyoshi Ono, Kitakyusyu (JP)

(73) Assignees: Oji Paper Co., Ltd., Tokyo (JP); Oji Seitai Kaisha, Ltd., Tokyo (JP)

( * ) Notice: Subject to any disclaimer, the term of this patent is extended or adjusted under 35 U.S.C. 154(b) by 135 days.

(21) Appl. No.: 10/499,050

(22) PCT Filed: Feb. 7, 2003

(86) PCT No.: PCT/JP03/01344

§ 371 (c)(1),
(2), (4) Date: Jun. 16, 2004

(87) PCT Pub. No.: WO03/066713

PCT Pub. Date: Aug. 14, 2003

(65) Prior Publication Data

US 2005/0019537 A1    Jan. 27, 2005

(30) Foreign Application Priority Data

Feb. 8, 2002    (JP) .............................. 2002-032400

(51) Int. Cl.
*B32B 27/32*    (2006.01)
(52) U.S. Cl. ........................... 428/516; 428/523
(58) Field of Classification Search ................ 428/516, 428/523
See application file for complete search history.

(56) References Cited

U.S. PATENT DOCUMENTS 6,132,827 A * 10/2000 Miro .......................... 428/35.9
6,224,957 B1 * 5/2001 Crook et al. .............. 428/36.91

FOREIGN PATENT DOCUMENTS

| EP | 0 140 121 | 5/1985 |
|---|---|---|
| JP | 51-25547 | 3/1976 |
| JP | 2000-326455 | 11/2000 |
| JP | 2001-341238 | 12/2001 |

OTHER PUBLICATIONS

Polytail Low Molecular Weight Polyolefin Polyol, Mitsubishi Chemical Corporation (In English (Admitted Prior Art), Publication date Not Available.

* cited by examiner

*Primary Examiner*—D. S. Nakarani
(74) *Attorney, Agent, or Firm*—Michael J. Striker

(57) ABSTRACT

The stretch film for rustproof stretch packaging has an appropriate roll tack and sufficient self-tack to adhere to and package an object, such as a steel coil. This stretch film has an overall density of 0.870 to 0.935 $g/cm^3$ and is composed of polyolefin resin, rust preventive agents, and an effective amount of a polyolefin polyol adhesive with a number average molecular weight of 500 to 5,000 g/mol. When the film has at least three layers, one surface layer has a density of 0.850 to 0.920 $g/cm^3$, and another surface lever on the opposite side of the film and intermediate layers between them have greater densities. The polyolefin polyol adhesive and the rust preventive agents are present at least in the low density surface layer.

9 Claims, No Drawings

RUST PREVENTIVE FILM FOR STRETCH PACKAGING

FIELD OF THE INVENTION

The present invention relates to a polyolefin film for stretch packaging, and more particularly, to a stretch film having a rustproof function favorably used as packaging material for automatic packaging of a steel coil by stretch packaging apparatus.

The term "stretch film" is used herein to describe a film which has a self-tack property, stretches by application of external force, and shrinks by its elastic recovery force by removing the external force. Such a film is called "cling film (in England)" or "plastic wrap (in the United State of America)". When a stretch film is used as packaging material, its quality characteristic allows packaging of an object tightly in an orderly form.

BACKGROUND ARTS

Conventionally, packaging materials such as antirust papers, and synthetic resin films tempered with rust preventive agents have been used for packaging a steel coil. However, recently, a new technology has gained attention, in which a rustproof stretch film containing preservative is utilized so as to make a transparent film with self-adhesive properties (pressure sensitive adherence) and stretchability for automatic packaging of a steel coil.

Japanese unexamined publication No. 2000-326455 discloses a rustproof stretch film comprising three layers in which an intermediate or a core layer is composed of a low density polyethylene resin with a density of 0.920–0.935 g/cm$^3$ mixed with volatile rust preventive agents, a film composed of an ethylene-vinyl acetate copolymer resin is laminated to the first outer layer (surface layer) of the intermediate layer, and a film of polyolefin resin is laminated to the second outer layer (surface layer) of the intermediate layer. In this rustproof stretch film, one surface of outer layers, which is composed of an ethylene-vinyl acetate copolymer resin, functions as an adhesive layer. Moreover, Japanese unexamined publication No. 2001-341238 discloses a rustproof stretch film comprising two-layers in which a rustproof layer is formed from materials in which an ethylene-α-olefin copolymer resin with a density of 0.890–0.920 g/cm$^3$ is mixed with volatile rust preventive agents, and an adhesive layer is formed from ethylene-vinyl acetate copolymer resin containing liquid aliphatic hydrocarbons as adhesive agents.

When a steel coil is automatically packaged utilizing a rustproof stretch film, such a stretch film used as a packaging material has been generally taken up to a roll. The width of such a roll (the width of a film) is normally 25 cm. In an automatic packaging apparatus for a steel coil, when a roll to which a rustproof stretch film has been taken up is stored in a self-propelled cartridge that rotates along an elliptic orbit passing through a hollow part of a steel coil, the rustproof stretch film in a tape form is continuously pulled out from the take-up roll arranged in the self-propelled cartridge so as to wind around the surface of the steel coil with its adhesive face inside. The steel coil that is supposed to be packaged rotates in a fixed direction along an axis of itself as it interlocks with the rotation of the self-propelled cartridge in the elliptic orbit so that the both end surfaces, external surface, and internal surface of the steel coil can be packed with the rustproof stretch film in the tape form equally and thoroughly.

The adhesion strength of a rustproof stretch film determines not only the operability of the automatic packaging but also whether or not rusting of a steel coil can be successfully prevented. The adhesion of a rustproof stretch film is considered to include two different kinds of adhesion, i.e., a roll tack (adhesion 1) and a self-tack (adhesion 2).

A roll tack involves adhesive resistance at the time when a tape-type film is pulled out from a take-up roll arranged in a self-propelled cartridge. The strength of the roll tack represents the strength of the pull out resistance, and therefore, the greater the roll tack is, the greater the pull out resistance is. Hence, the operability upon the automatic packaging is closely connected to the roll tack of the rustproof film. For example, when the roll tack of the rustproof stretch film is excessive, a neck-in which occurs at the time of pulling the tape-type film from the take-up roll associated with the rotation of the self-propelled cartridge becomes large so that the overlapping width of films becomes small, which may break the film and cause the interruption of the packaging operation. Further, when the roll tack of the film is deficient, a change of speed of a self-propelled cartridge during a packaging operation or abrupt deceleration at the end of the packaging operation causes a film to be pulled out excessively from the take-up roll by the inertia brought by rotation of the take-up roll and to become twisted, which prevents continuous operation.

On the other hand, a self-tack of a rustproof stretch film involves the adhesion between films that have packed a steel coil or the like. The greater the self-tack is, the firmer the films taken up to a steel coil adhere to each other after packaging. Hence, a self-tack of a rustproof stretch film relates to the rust preventative capacity of the packaging material. Namely, when a rustproof stretch film with a great self-tack is used, the chance that moisture infiltrates into a gap between laminated films becomes less, which allows the preservation ability to perform better. Further, when a rustproof stretch film includes volatile rust preventive agents, not only the volatilization of the rust inhibitor to external environment becomes less but also the infiltration of the moisture becomes less, so that the preservation ability performs even better.

Conversely, when the self-tack of the film is deficient, the film that is a packaging material is liable to come off a steel coil, which will lose the satisfactory rust preventative effect of the steel coil.

SUMMARY OF THE INVENTION

It is the object of the present invention to provide a rustproof stretch film comprising a single or plurality of laminated layers of polyolefin resin having excellent properties in transparency, strength, flexibility, and stretchability, and having roll tack property which is neither excessively great nor small when the film is pulled out from a take-up roll, and an excellent self-tack property which allows the film to adhere to an object to be packaged without peeling when the single or plurality of laminated layers package a steel coil.

A rustproof stretch film of the present invention comprises a single layer structure or a multi-layer structure composed of polyolefin resin, wherein said film comprises the effective amount of low molecular weight polyolefin polyol functioning as an adhesive agent, and rust preventive agents, and wherein the overall density of the film is within a range of 0.870–0.935 g/cm$^3$ no matter when the film is a single layer or a multi-layer.

A rustproof stretch film of a multi-layer structure according to the present invention consists of a two-layer, three-layer, or more than three-layer laminated film of resin layers. In this case, one surface layer is a low density layer having lower density compared with other layer(s). The density of the low density layer is within a range of 0.850–0.920 g/cm$^3$, and more preferably, within a range of 0.860–0.910 g/cm$^3$.

When a rustproof stretch film of a multi-layer structure has a three-layer structure, it consists of a low density layer, intermediate layer, and an opposite side surface layer. In this case, the density of the intermediate layer is preferably same or greater than that of the opposite side surface layer in order to attain a certain degree of film strength and rigidity.

BEST MODE FOR CARRYING OUT THE INVENTION

As a material for a rustproof stretch film of the invention, polyolefin resin is used in which its melt flow rate (MFR) is preferably within a range of 0.3–5.0 g per 10 minutes. The term "polyolefin resin" used herein includes polyethylene, polypropylene, copolymers of ethylene and α-olefin, or the like. Above all, low-density polyethylene, in particular, linear low-density polyethylene (LLDPE) is recommended as a film material in the present invention.

When a rustproof stretch film of the invention has a single layer structure, the overall density of the film is within a range of 0.870–0.935 g/cm$^3$. A density of less than 0.870 g/cm$^3$ makes the formability deteriorate, while a density of greater than 0.935 g/cm$^3$ not only reduces the bleeding capacity of adhesives and volatile rust inhibitor, but also makes the film too firm and brittle so that the strength of the film is degraded. Due to similar reasons, the density is preferably within a range of 0.890–0.925 g/cm$^3$.

Further, when the film is a multi-layer film, the overall density of the film is within a similar range of the above.

When a rustproof stretch film has a multi-layer structure, at least one surface layer consists of a low density layer with a density of 0.850–0.920 g/cm$^3$ in order to attain the aforementioned self-tack, and the density of layers other than this layer is higher than that of the low density layer. When the film has a three-layer structure, both surface layers can consist of low density layers. However, preferably, only one of the surface layers consists of a low density layer.

When the density of the low density layer is less than 0.850 g/cm$^3$, the adhesion becomes too strong, which causes problems in molding such as sticking firmly to a take-up roll and guide rolls, and in packaging process performed by users. Furthermore, when the density is higher than 0.920 g/cm$^3$, it becomes difficult for adhesives or preservatives to bleed out to the surface of film, which will be explained below. Due to similar reasons, a preferable range of the low density layer is 0.860–0.910 g/cm$^3$.

The layers other than the low density layer have higher density so as to maintain the overall density of the film in a range of 0.870–0.935 g/cm$^3$.

The most preferable combination is the overall density of the film in a range of 0.890–0.925 g/cm$^3$, and the density of the low density layer in a range of 0.860–0.910 g/cm$^3$.

In the multi-layer structure of the rustproof stretch film, low molecular weight polyolefin polyol adhesives of the invention must exist in the low density layer, which is a surface layer, i.e. a layer having self-adhesive properties. This layer contacts an object to be packaged such as steel coil, and rust preventive agents also exist in this layer.

In this invention, low molecular weight polyolefin polyol is used as an adhesive. As a viscid fluid or wax-type solid at normal temperature, comprising a number average molecular weight of 500–5,000, having an olefinic skeleton, low molecular weight polyolefin polyol is a chemically stable adhesive high in saturation, having a hydroxyl group at both ends of a molecule. It appears on the market under trade names such as "POLYTAIL H", "POLYTAIL HA" (both manufactured by MITSUBISHI CHEMICAL CORPORATION) or "EPOL" (manufactured by IDEMITSU PETROCHEMICAL CORPORATION).

As low molecular weight polyolefin polyol has higher compatibility with polyolefin resin, which is a film material, compared to polybutene (also called polyisobutylene) which has been conventionally used as an adhesive, it does not impair the transparency or strength. Further, as it is easy to bleed on a film surface, a relatively small amount of agent can provide an appropriate adhesion to the rustproof stretch film of the invention. That is, the roll tack is neither too small nor too large, but is in an appropriate range so that the self-tack becomes great and desirable.

Although conventional stretch films, such as the prior art stretch films described above, have been manufactured by adding adhesives to resin to provide the necessary adhesion for use as a stretch film, the thus obtained film is easy to block. That is, while it has an excessive roll tack adhension, self-tack decreases and becomes small after packaging, which demonstrates its poor quality. While low molecular weight polyolefin polyol according to the invention provides the film with sufficient self-tack, it also exercises a particular effect that prevents the blocking mentioned previously. Such an effect has been confirmed by the present invention for the first time.

Moreover, this pressure sensitive adhesive provides flexibility to a film so as to reduce the brittleness of the film. Therefore, polyolefin resin that has a relatively high density can be used. In addition, due to its high degree of saturation, the thermostability at the time of recovery and reuse of film trimmings is excellent, and degradation problems at the time of molding can be prevented, which is an advantage due to the invention.

The amount of low molecular weight polyolefin polyol adhesives to be blended is selected from a range of 0.01–3.0 mass (%) of the whole film no matter whether the film has a single layer structure or multi-layer structure.

Although rust preventive agents or rust inhibitors used in the invention are not limited specifically, volatile corrosion inhibitors that evaporate or sublime at room temperature, or water-soluble corrosion inhibitors are preferable. Especially, volatile corrosion inhibitors are more preferable. Although there is no restriction about volatile corrosion inhibitors, nitrites, ammonium compounds, urea compounds, and mixtures of those compounds are typically used. In particular, a mixture of nitrite and ammonium compounds and/or urea compounds is preferable. As examples of nitrites, alkali metal nitrites, such as sodium nitrite and potassium nitrite and alkaline earth metal nitrites, such as magnesium nitrite and calcium nitrite are cited. As examples of ammonium compounds, ammonium salts of benzoic acid, phthalic acid, stearic acid, palmitic acid, and oleic acid are cited. As examples of urea compounds, urea, urotropin, and phenyl carbamate are cited.

The compounded amount of the rust preventive agents is selected from a range of 0.05–1.0 mass % regardless of the fact that the film has a single layer structure or multi-layer structure.

Further, in order to improve packaging aptitude and durability after packaging, it is also possible to include an appropriate amount of slipping agent, anti-blocking agent, electrostatic inhibitor, antioxidant, ultraviolet absorbent, photostable agent, and weather proof agent in any layer within a range not affecting the crystalline properties of the film to an excessive degree.

Now, a manufacturing method of a rustproof stretch film of the invention is explained below.

In manufacturing a rustproof stretch film of the invention, a single-layer or multiple-layer extrusion method can be employed, in which molten resin is extruded so as to form a sheet. Typically, a single-layer or multi-layer extrusion method according to a T-die method or blown film method is employed. The film can also be drawn in uniaxial direction or biaxial directions. When a film having multi-layer structure is manufactured, another method is possible in which a layer is molded by extruding and cooling molten resin, and then another molten resin is extruded and laminated onto it.

When a rustproof stretch film of the invention has a single layer structure, low molecular weight polyolefin polyol adhesives and rust preventive agents are added into resin by using such a method that these adhesives and preservatives are mixed and melted with resin pellet.

When a rustproof stretch film of the invention has a multi-layer structure, low molecular weight polyolefin polyol adhesives are mixed with resin that forms at least one layer while rust-inhibitors are mixed with the said resin or other resins that forms other layers, so that a laminated film can be formed by the aforementioned various methods. Low molecular weight polyolefin polyol adhesives and rust-inhibitors can be mixed with resin that forms either a same layer or other layers.

Further, low molecular weight polyolefin polyol adhesives and rust-inhibitors can be mixed with resins that form each layers, respectively.

There is no restriction about addition of the adhesives to the layers. In a multi-layer structure, adhesives can be added to a low density layer or other layers. In the thus obtained film, adhesion appears in the layer which has the lowest density (i.e. low density layer) regardless of the layer or layers in which adhesives are added. Consequently, appropriate adhesion is attained on the surface of the low density layer.

Although the reason why adhesives are prone to bleed out on the surface of a low density layer regardless of the layers in which they are added is uncertain, inventors of the present invention assume that molecular motion is most active in a low density layer, which produces more gaps between molecules into which the adhesives can pass.

Similar to adhesives, rust preventive agents can be added to any resin regardless of the layers it forms.

Among the above multi-layer extrusion methods, it is preferable to employ a multi-layer blown film process for manufacturing a rustproof stretch film of the invention. Because when rust preventive agents used in this multi-layer blown film process are volatile, if these are blended with an inner layer film or an intermediate layer film, they are located inside of inflated bubbles so as to be surrounded by an outer layer film. Thus, as there is no risk that the room for manufacturing such a film is contaminated by the volatile corrosion inhibitors.

Even if a rustproof stretch film of the invention has single layer structure or multi-layer structure, any surface treatment, such as corona discharge treatment, can be applied on the film, if necessary.

Although the thickness of a rustproof stretch film of the invention can be determined arbitrarily, generally, it is of thickness of 40–100 μm, which is used commonly for a packaging material for a steel coil.

When a rustproof stretch film of the invention has a three-layer structure, the thickness ratio of these layers are determined within a range of a=1–7, b=0.5–3, wherein the low density layer/the intermediate layer/the opposite side surface layer =1/a/b, by comprehensively considering the formability, gained effect of adhesion, strength, flexibility, and tightness of the steel coil packaging. When such a film has a two-layer structure, the thickness ratio of the both layers is determined within a range of 6/1–1/6.

Now, examples and comparison examples are shown to explain a rustproof stretch film of the invention in detail. It will be appreciated that these examples do not limit or restrict the technical scope of the invention.

Namely, characteristics of each stretch film obtained by each example and comparison example described below are evaluated by the following method:

(Roll Tack: Adhesion 1)

Each stretch film with a single- or multi-layer structure has been taken up in a roll in such a manner that a surface having less adhesion is inside. The end of the wound film has been pulled by a spring balance to measure its tension as a roll tack.

(Self-Tack: Adhesion 2)

In a thermo-hygrostat room with 23° C. and the relative humidity of 50%, a stretch film has been cut into two pieces 200 mm in length×50 mm in width in a longitudinal direction of the film. One film with greater surface adhesion has been overlapped with the other film with less surface adhesion, with an overlapping area 50 mm×50 mm, to place a weight of 2 kg thereon and leave for an hour with the same temperature and humidity condition. Then, the film has had shear-tension applied in a longitudinal direction by a TENSILON, one of the Tension/Compression Testing Machines (Toyo Seiki Seisaku-sho, Ltd.) with an initial clamp length of 100 mm. The maximum tensile strength is determined as a self tack and the elongation percentage is calculated by dividing the elongation at the time of maximum tensile strength by the original length; then, the value is multiplied by 100. Further, the product in which a self-tack is multiplied by the elongation percentage is defined as a self-tack index so as to represent a self-tack level.

(Rust Preventive Effect)

A length of cold-rolled steel (JIS G 3141 SPCCSD 60 mm×80 mm×2.3 mm) has been placed in a bag made from a stretch film and sealed by heat sealing. The thus obtained sealed sample has been stored in an oven whose inside atmosphere has been changed as described below to evaluate the rusting situation of the above cold-rolled steel after 24 hours:

10° C. 80% RH 3 hr

50° C. 95% RH 3 hr

10° C. 80% RH 3 hr

50° C. 95% RH 15 hr

The following is the performance index:

◎: no rusting, ○: a few spot rusting (1–3 spots), Δ: several spot rusting (4–10 spots), ▼: many spot rusting (more than 10 spots), X: overall discoloration/face rusting (Prick Test)

The test has been performed pursuant to JIS Z1707:

The end R of the pricking jig: R=0.6 mm

The pricking speed: 50 mm/min.

The film size: 45 mmΦ

(Measurement of Film Surface Adhesives)

| Analytical method: | X-ray Photoelectron Spectroscopy (XPS) |
|---|---|
| Instrument model: | ESCA750 manufactured by SHIMADZU CORPORATION |
| X-ray Source: | Mg Kα (8 kV 30 mA) |
| Photoelectron uptake angle: | 90° |
| Analytical diameter: | 10 mm Φ |
| Spectral Region Definitions: | ① C1s (280–295 eV) |
|  | ② O1s (525–540 eV) |

As to a rustproof stretch of the present invention, it is preferable that the O/C value measured pursuant to XPS method is within a range of 0.1–5.0 atm %.

EXAMPLE 1

A multi-layer blown film forming equipment has been used to make a rustproof stretch film of three-layer structure of 60 μm thickness under the condition of the extrusion resin temperature of 180, the blow-up ratio of 2, and the thickness ratio of each layer 1/1/1 by using three kinds of film materials (resins) as described below:

Internal Layer: Volatile rust preventive agents have been blended with an equalizing mixture of an LLDPE (density: 0.920 g/cm$^3$, MFR: 1.0 g/10 min.) and another LLDPE (density: 0.902 g/cm$^3$, MFR: 1.0 g/10 min.) in the proportion of 0.3 mass % to the whole multi-layer film, while the compounded amount of low molecular weight polyolefin polyol adhesives (manufactured by MITSUBISHI CHEMICAL CORPORATION, the trade name: POLYTAIL HA) has been changed as shown in table 1.

Intermediate Layer: Except for the omission of the blending of rust preventive agents and adhesives, the same LLDPE for the internal layer resin has been used.

External Layer: an LLDPE (density: 0.875 g/cm$^3$, MFR: 3.0 g/10 min.) has been used.

As the results of the examination of the adhesion of the thus obtained multi-layer film, we found that the surface of the internal layer showed hardly any adhesion but the surface of the external layer showed adhesion.

The film surface having adhesive mixing ratio of 0.5% has been analyzed by using XPS and obtained the O/C value of the surface of the external layer of 2.7 atm %, and the O/C value of the surface of the internal layer of 0.4 atm %. This result demonstrates that a certain amount of low molecular weight polyolefin polyol exists in the external layer surface, and less in the internal layer surface.

COMPARISON EXAMPLE 1

Except for the amount of adhesive agents blended with the internal layer resin used in example 1 being changed to the proportion of 0.5 mass % to the whole multi-layer film, and no rust preventive agent being blended, the same internal layer resin, intermediate layer resin, external layer resin used in example 1 have been used under the same conditions as example 1 to obtain a stretch film of three-layer structure.

As the results of the examination of the adhesion of the thus obtained multi-layer film, we found that the surfaces of the internal layers showed hardly any adhesion but the surfaces of the external layers showed adhesion. We also observed that a film according to this example indicated greater roll-tack and self-tack compared to example 1.

COMPARISON EXAMPLE 2

Each resin component of the internal layer resin, intermediate layer resin, and external layer resin used in example 1 have been replaced with an LLDPE (density: 0.926 g/cm$^3$, MFR: 1.0 g/10 min.), while the amount of adhesives blended with the internal layer resin has been changed to the proportion of 0.5 mass % to the whole multi-layer film, and the amount of rust preventive agents has been changed to the proportion of 0.3 mass % to the whole multi-layer film. Except for those changes, the same condition as example 1 has been maintained to obtain a rustproof stretch film of the three-layer structure.

As the results of the examination of the adhesion of the thus obtained multi-layer film, we found that both the roll-tack and self-tack became extremely small.

COMPARISON EXAMPLE 3

The adhesive agents blended with the internal layer resin in example 1 have been replaced with polybutene, and the amount of composition has been changed as shown in table 1. Except for those changes, the same condition as example 1 have been maintained to obtain a rustproof stretch film of the three-layer structure.

As the results of the examination of the adhesion of the thus obtained multi-layer film, we found that the adhesion between the surfaces of the internal layers and between those of the external layers showed the similar tendency to example 1. However, the roll-tack became greater and the self-tack became less when compared with example 1.

The characteristics of each multi-layer stretch film obtained by example 1 and comparison examples 1–3 have been evaluated in accordance with the previously described method. The results are shown in table 1:

In the density of table 1, "total" represents the density of the whole film, and "external layer" represents the density of the external layer which corresponds to the low density layer of the multi-layer structure film.

EXAMPLE 2

A multi-layer T-die film forming equipment has been used to make a rustproof stretch film of three-layer structure of 60 μm thickness under the condition of the extrusion resin temperature of 240° C., and the thickness ratio of each layer is 1/1/1 by using three kinds of film materials (resins) as described below:

The term "contact layer resin" is used herein to indicate a resin extruded from a T-die to form a film layer which directly contacts a cooling roller, and the term "non-contact layer resin" is used to indicate a resin extruded from a T-die to form a film layer placed on the opposite side of the above film layer having an intermediate layer film therebetween.

Contact Layer Resin: An equalizing mixture of an LLDPE (density: 0.912 g/cm$^3$, MFR: 3.8 g/10 min.) and another LLDPE (density: 0.902 g/cm$^3$, MFR: 3.0 g/10 min.) has been used.

Intermediate Layer: The identical resins used in the above contact layer have been used. The identical rust preventive agent used in example 1 in the proportion of 0.3 mass % to the whole multi-layer film has been blended, and the identical low molecular weight polyolefin polyol adhesives have been blended with the layer. However, the compound ratio of the adhesive agents to the whole multi-layer film has been changed as shown in table 2.

Non-Contact Layer Resin: The identical LLDPE used for the external layer resin in example 1 has been used.

As the results of the examination of the adhesion of the thus obtained multi-layer film, we found that the surface of the contact layer side showed hardly any adhesion but the surface of the non-contact layer side showed adhesion. Further, the roll-tackiness became less, but the self-tackiness became greater when compared with the multi-layer film of example 1.

EXAMPLE 3

A multi-layer blown film forming equipment has been used to make a rustproof stretch film by replacing the LLDPE resin (density: 0.920 g/cm$^3$, MFR: 1.0 g/10 min.) for the internal layer and intermediate layer used in example 1 with another LLDPE resin (density: 0.926 g/cm$^3$, MFR: 1.0 g/10 min.), and also replacing the LLDPE resin (density: 0.875 g/cm$^3$, MFR: 3.0 g/10 min.) for the external layer with another LLDPE resin (density: 0.908 g/cm$^3$, MFR: 1.0 g/10 min.). Further, rust preventive agents have been blended with an intermediate layer resin, while adhesives have been blended with the internal layer resin and/or the intermediate layer resin. The compound ratio to the whole multi-layer film has been changed as shown in table 2. Except for those changes, the identical conditions of example 1 have been maintained to make a rustproof stretch film of a three-layer structure.

As the results of the examination of the adhesion of the thus obtained multi-layer film, we found that both the roll-tack and self-tack became slightly less compared with example 1, wherein the more adhesives have been blended with the intermediate layer resin, the lower the roll-tack has become, and the greater the self-tack has become.

The characteristics of each multi-layer stretch film have been evaluated in a similar manner of example 1, and its results are shown in table 2:

EXAMPLE 4

A multi-layer blown film forming equipment has been used to make a rustproof stretch film in which the two kinds of the LLDPE resins for the internal layer used in example 1 has been used for one layer (A-layer) with mass ratio of high density resin/low density resin =80/20, while the LLDPE resin for the external layer used in example 1 has been used for the other layer (B-layer). Further, rust preventive agents and adhesives have been blended with the A-layer resin. The compound ratio to the whole multi-layer film has been changed as shown in table 2. The thickness of the A-layer and B-layer has been changed to 30 μm, respectively. Except for those changes, the identical conditions of example 1 have been maintained to make a rustproof stretch film of a two-layer structure.

As the results of the examination of the adhesion of the thus obtained film, we found that the roll-tack became slightly greater while the self-tack became slightly less compared with example 1. However, the thus obtained film was sufficient to use.

The characteristics of each multi-layer stretch film have been evaluated in a similar manner of example 1, and its results are shown in table 2:

TABLE 1

| Item | Density (g/cm$^3$) Total | Density (g/cm$^3$) External Layer | Adhesives Kind | Adhesives Compound ratio (%) | Rust preventive agents (%) | Roll Tack (kg/250 mm) | Self-Tack Adhesion (a) (N/50 mm) | Self-Tack Elongation (%)(b) | Self-Tack Index (a × b) | Prick Strength (N) | Prick Elongation (%) | Prick Energy (Strength × elongation) | Rust Preventive Effect 10 days |
|---|---|---|---|---|---|---|---|---|---|---|---|---|---|
| Example 1 | 0.904 | 0.875 | Polyol | 0.50 | 0.3 | 2.5–3.5 | 25.0 | 380 | 9,500 | 3.0 | 65 | 195 | ◎–○ |
|  |  |  |  | 0.30 | 0.3 | 4.0–5.0 | 22.0 | 300 | 6,600 | 3.0 | 65 | 195 | ◎–○ |
|  |  |  |  | 0.15 | 0.3 | 4.5–5.5 | 19.0 | 35 | 665 | 3.0 | 65 | 195 | ◎–○ |
|  |  |  |  | 0.10 | 0.3 | 4.5–5.5 | 18.0 | 25 | 450 | 3.0 | 65 | 195 | ◎–○ |
|  |  |  |  | None | 0.3 | 5.0–6.0 | 17.0 | 10 | 170 | 3.0 | 60 | 180 | ◎–○ |
| Comparison Example 1 | 0.904 | 0.875 | Polyol | 0.50 | 0 | 5.5–6.5 | 28.0 | 450 | 12,600 | 3.0 | 65 | 195 | X |
| Comparison Example 2 | 0.927 | 0.926 | Polyol | 0.50 | 0.3 | 0.7–0.9 | 3.5 | 4 | 14 | 3.3 | 60 | 198 | ○ |
| Comparison Example 3 | 0.901 | 0.875 | Poly-butylene | 0.90 | 0.3 | 4.0–5.0 | 16.0 | 16 | 256 | 2.7 | 60 | 162 | ◎–○ |
|  |  |  |  | 0.50 | 0.3 | 4.5–5.5 | 14.0 | 15 | 210 | 2.7 | 60 | 162 | ◎–○ |
|  |  |  |  | 0.30 | 0.3 | 5.0–6.0 | 17.0 | 14 | 238 | 2.7 | 60 | 162 | ◎–○ |
|  |  |  |  | 0.20 | 0.3 | 5.3–6.3 | 17.0 | 10 | 170 | 2.7 | 60 | 162 | ◎–○ |

TABLE 2

| Item | Density (g/cm³) Total | Density (g/cm³) External Layer (Non-contact Layer) | Adhesives Kind | Adhesives Compound ratio (%) | Rust preventive agents (%) | Roll Tack (kg/250 mm) | Self Tack Adhesion (a) (N/50 mm) | Self Tack Elongation (%) (b) | Self Tack Index (a × b) | Prick Strength (N) | Prick Elongation (%) | Prick Energy (Strength × elongation) | Rust Preventive Effect 10 days |
|---|---|---|---|---|---|---|---|---|---|---|---|---|---|
| Example 2 | 0.901 | 0.875 | Polyol | 0.30 | 0.3 | 2.4–3.4 | 26.0 | 400 | 10,400 | 3.8 | 55 | 209 | ◎ |
|  |  |  |  | 0.10 | 0.3 | 2.7–3.8 | 20.0 | 130 | 2,600 | 3.7 | 55 | 204 | ◎ |
|  |  |  |  | 0.05 | 0.3 | 3.2–4.3 | 19.0 | 60 | 1,140 | 3.7 | 55 | 204 | ◎ |
|  |  |  |  | None | 0.3 | 4.8–5.8 | 18.0 | 15 | 270 | 35 | 40 | 140 | ◎ |
| Example 3 | 0.921 | 0.908 | Polyol | 0.5  0 | 0.3 | 2.1–2.5 | 18.0 | 220 | 3,960 | 3.1 | 60 | 186 | ◎–○ |
|  |  |  |  | 0.2  0.3 | 0.3 | 2.3–2.7 | 20.0 | 270 | 5,400 | 3.1 | 60 | 186 | ◎–○ |
|  |  |  |  | 0    0.5 | 0.3 | 2.7–3.0 | 22.0 | 320 | 7,040 | 3.1 | 60 | 186 | ◎–○ |
| Example 4 | 0.895 | 0.875 | Polyol | 0.50 | 0.3 | 3.0–4.0 | 22.0 | 350 | 7,700 | 2.9 | 65 | 189 | ◎–○ |
|  |  |  |  | 0.30 | 0.3 | 4.3–5.3 | 20.0 | 270 | 5,400 | 2.9 | 65 | 189 | ◎–○ |
|  |  |  |  | 0.15 | 0.3 | 4.7–5.5 | 18.0 | 32 | 576 | 2.9 | 65 | 189 | ◎–○ |

INDUSTRIAL APPLICABILITY

A stretch film according to the invention can be freely applied to any packaging machinery for high-speed packaging or normal-speed packaging. Further, rust preventive agents or adhesive agents can effectively bleed to a surface layer of the film, which results in a great reduction effect. Moreover, as mechanical strength can be maintained, a cost reduction effect is also expected. Furthermore, in a rustproof stretch film of a multi-layer structure, when a volatile corrosion inhibitor is used as a rust preventive agent, blending of the inhibitor is performed in an internal or intermediate layer with multi-layer blown film molding, and an intermediate layer with multi-layer T-die molding, which allows the volatile corrosion inhibitor to vaporize during the film making process so that the contaminant in the manufacturing room can be reduced.

What is claimed is:

1. A stretch film for rustproof stretch packaging with a single-layer structure or a multi-layer structure,
   wherein said stretch film has an overall density within a density range of 0.870 to 0.935 g/cm³ and comprises polyolefin resin, rust preventive agents, and an effective amount of a polyolefin polyol adhesive with a number average molecular weight of from 500 to 5,000 g/mol.

2. A stretch film as defined in claim 1, with a two-layer structure, said two-layer structure consisting of a low density layer and another layer, wherein said low density layer has a layer density within a range of 0.850 to 0.920 g/cm³ and said another layer has a greater density than the layer density of the low density layer, and wherein the polyolefin polyol adhesive and the rust preventive agents are present in the low density layer.

3. A stretch film as defined in claim 2, wherein the layer density of the low density layer is within a range of 0.860 to 0.910 g/cm³.

4. A stretch film as defined in claim 2, wherein the overall density is within a range of 0.890 to 0.925 g/cm³.

5. A stretch film as defined In claim 2, wherein the layer density of the low density layer is within a range of 0.860 to 0.910 g/cm³ and the overall density is within a range of 0.890 to 0.925 g/cm³.

6. A stretch film as defined in claim 1, with a multi-layer structure comprising three or more layers, said three or more layers including a low density surface layer whose layer density is within a range of 0.850 to 0.920 g/cm³; another surface layer on a side opposite from the low density surface layer; and one or more intermediate layers; and wherein layer densities of the another surface layer and the intermediate layers are greater than the layer density of the low density surface layer, and wherein the polyolefin polyol adhesive and the rust preventive agents are present In the low density surface layer.

7. A stretch film as defined in claim 6, whereIn the layer density of the low density surface layer is within a range of 0.860 to 0.910 g/cm³.

8. A stretch film as defined in claim 6, whereIn the overall density is within a range of 0.890 to 0.925 g/cm³.

9. A stretch film as defined in claim 6, wherein the layer density of the low density surface layer is within a range of 0.860 to 0.910 g/cm³ and the overall density is within a range of 0.890 to 0.925 g/cm³.

* * * * *